US009573632B2

(12) United States Patent
Van Der Knaap et al.

(10) Patent No.: US 9,573,632 B2
(45) Date of Patent: Feb. 21, 2017

(54) SUSPENSION SYSTEM FOR A DRIVER'S COMPARTMENT OF A VEHICLE (71) Applicant: DAF Trucks N.V., Eindhoven (NL)

(72) Inventors: Albertus Clemens Maria Van Der Knaap, Eindhoven (NL); Menno Adrianus Beenakkers, Rijen (NL); Jeroen Vandenhoudt, Deurne (NL); Christian Groh, Gersheim (DE); Patrik Fuchs, Kirkel (DE); Frank Kattler, Püttlingen (DE)

(73) Assignee: DAF Trucks N.V., Eindhoven (NL)

( * ) Notice: Subject to any disclaimer, the term of this patent is extended or adjusted under 35 U.S.C. 154(b) by 14 days.

(21) Appl. No.: 14/430,123

(22) PCT Filed: Sep. 23, 2013

(86) PCT No.: PCT/NL2013/050678
§ 371 (c)(1),
(2) Date: Mar. 20, 2015

(87) PCT Pub. No.: WO2014/046545
PCT Pub. Date: Mar. 27, 2014

(65) Prior Publication Data
US 2015/0246695 A1 Sep. 3, 2015

(30) Foreign Application Priority Data

Sep. 24, 2012 (NL) ...................................... 2009504

(51) Int. Cl.
*F16K 31/02* (2006.01)
*B62D 33/06* (2006.01)
(Continued)

(52) U.S. Cl.
CPC ..... *B62D 33/0608* (2013.01); *B60G 17/0528* (2013.01); *B60G 99/008* (2013.01);
(Continued)

(58) Field of Classification Search
CPC .............. B60G 17/0528; B60G 99/008; B62D 33/0608; F16K 1/34; F16K 31/0658
(Continued)

(56) References Cited

U.S. PATENT DOCUMENTS 5,823,505 A    10/1998    Stoll et al.
6,505,812 B1 *    1/2003    Anastas .................. F16K 41/10
                                                  251/129.07
(Continued)

FOREIGN PATENT DOCUMENTS

DE         195 36 607 A1      4/1997
DE         196 32 379 A1      2/1998
(Continued)

OTHER PUBLICATIONS

Oct. 16, 2013—(WO) International Search Report of PCT/NL2013/050678.

*Primary Examiner* — Todd M Epps
(74) *Attorney, Agent, or Firm* — Banner & Witcoff, Ltd.

(57) ABSTRACT

A pneumatic suspension system for a vehicle is provided comprising a mounting arrangement for mounting a portion of the vehicle on a chassis; the mounting arrangement including at least one pneumatic spring to be arranged and coupled between the portion of the vehicle and the vehicle chassis. A vehicle state control system is provided that provides a pressure set value in the pneumatic spring and a pressure controller is arranged to a valve device alternatively for pressurizing or depressurizing the each pneumatic spring. The valve device comprises at least a first valve having a valve outlet coupled to the spring terminal and a valve inlet communicatively coupled to the pressure terminal. A support structure (102) distinct from the sealing edge (104) is provided arranged to providing supporting contact to the sealing face to counteract deformations of the sealing face.

15 Claims, 11 Drawing Sheets

(51) Int. Cl.
*B60G 17/052* (2006.01)
*B60G 99/00* (2010.01)
*F16K 31/06* (2006.01)
*F16K 1/34* (2006.01)

(52) U.S. Cl.
CPC ............ *F16K 1/34* (2013.01); *F16K 31/0658* (2013.01); *F16K 31/0686* (2013.01); *B60G 2204/162* (2013.01); *B60G 2500/204* (2013.01)

(58) Field of Classification Search
USPC .................. 248/550; 251/129.07, 129.15, 64
See application file for complete search history.

(56) References Cited

U.S. PATENT DOCUMENTS

| | | | |
|---|---|---|---|
| 7,303,177 B2* | 12/2007 | Harcombe | F02M 63/0015 239/96 |
| 8,348,231 B2* | 1/2013 | Czimmek | F02M 23/00 251/129.07 |
| 9,163,693 B2* | 10/2015 | Forster | F16F 9/464 |
| 9,259,601 B2* | 2/2016 | Zlatintsis | A62C 37/11 |
| 9,267,607 B2* | 2/2016 | Forster | F16F 9/464 |

FOREIGN PATENT DOCUMENTS

| | | |
|---|---|---|
| DE | 103 53 011 A1 | 6/2005 |
| DE | 10 2009 012581 A1 | 11/2009 |
| DE | 10 2010 012413 A1 | 9/2011 |
| EP | 1 734 296 A1 | 12/2006 |
| EP | 2381146 A2 | 10/2011 |

\* cited by examiner

SUSPENSION SYSTEM FOR A DRIVER'S COMPARTMENT OF A VEHICLE

CROSS-REFERENCE TO RELATED APPLICATIONS

This application is a U.S. National Stage application under 35 U.S.C. §371 of International Application PCT/NL2013/050678 (published as WO 2014/046545 A1), filed Sep. 23, 2013, which claims priority to Application NL 2009504, filed Sep. 24, 2012. Benefit of the filing date of each of these prior applications is hereby claimed. Each of these prior applications is hereby incorporated by reference in its entirety.

FIELD AND BACKGROUND OF THE INVENTION

The present invention relates to a suspension system for a driver's compartment of a vehicle, more in particular, a suspension system including pneumatic springs.

Driving comfort optimization in vehicles, in particular, trucks with cabins suspended from the vehicle's chassis, has always been a point of attention. While most focus has been on optimizing passive suspension and adjusting the passive characteristics to vehicle and/or road conditions also, suspension systems have been proposed that minimize the disturbances relayed via the chassis by actively neutralizing the impact of road and/or vehicle disturbances in the cabin's suspension system. The aim is here to neutralize any disturbance in the cabin so that the suspension system holds the cabin virtually stable in a forced position countering roll, pitch or heave movements that occur in the vehicle due to accelerations. In addition, the cabin may be kept in a rest position with minimal impact deflection.

Such conventional active suspension systems experience difficulty in tuning and suffer from fairly high energy demand, which is a drawback in today's focus for energy economization.

While most of the active suspension utilize hydraulic pressure, in SAE technical paper series/,pap. 910023 1991 A. Wiesmeier, F. Uffelmann (IVECO Truck Engineering) "Vibration Isolated Cabin by Active Suspension-Requirements, Concept and First Results" a pneumatic setup is contemplated. The paper further details on a hydraulic suspension with a proportional valve arrangement for a suspended cabin configuration. A central pressure supply source is used to operate the pressure cylinders. A pneumatic setup was found unattractive in view of temperature and energy efficiency considerations. Indeed, Boyles thermodynamic gas law requires a complex physical model to be able to control the springs based on mass flow.

DE102009012581 nevertheless explores this direction and utilizes an inverted model of thermodynamic ground equations that is linearized over a control range to provide a controlled force in the pneumatic springs wherein a feed forward control is required for prediction of the required air mass in the pneumatic spring. A pneumatic proportional valve is contemplated to implement as a valve between a central pressure and the pneumatic springs. Importantly, it is contemplated that a proportional valve has a settable valve opening, dependent on a control voltage (or electric solenoid current).

WO 2010/019038 discloses a multipoint hydraulic suspension with an active and passive control mode.

The invention has as an object to provide a driver's compartment suspension with a valve control concept that is easily manufacturable and that has a smooth and high precision control of the gas pressure in the pneumatic springs, in order to neutralize road and/or vehicle disturbances in the driver's compartment and which provides for a robust and sufficiently durable design, specifically improvement of lifetime and pressure control accuracy.

SUMMARY OF THE INVENTION

According to an aspect of the invention a pneumatic suspension system for a vehicle is provided, comprising a mounting arrangement for mounting a portion of the vehicle on a chassis; the mounting arrangement including at least one pneumatic spring to be arranged and coupled between the portion of the vehicle and the vehicle chassis. For each pneumatic spring respectively, a valve device is communicatively coupled to a pressure supply; a pressure uptake and a respective pneumatic spring via a respective pressure terminal; pressure uptake terminal and spring terminal A vehicle state control system is provided that provides a pressure set value in the pneumatic spring. A pressure controller is arranged to the valve device alternatively for pressurizing or depressurizing the each pneumatic spring. The valve device comprises at least a first valve having a valve outlet coupled to the spring terminal and a valve inlet communicatively coupled to the pressure terminal, and further comprises a valve seat comprising a sealing edge and valve member comprising a sealing face; the sealing edge being pressed in normally closed condition against the sealing face by an elastic force means; so that in use, an inlet pressure is exerted on the valve member via the valve seat orifice, the valve member being enclosed in the valve outlet so that an outlet pressure counteracts on the valve member; the valve member being subject to force generated by a pressure difference between inlet and outlet on an effective area of the sealing face defined by the sealing edge. An electric actuator is mechanically coupled to the valve member having a continuously variable force set point so as define, by the pressure controller, a set force counteracting the elastic force, to generate, by control of the force set point a set pressure difference between the inlet and outlet derived from the vehicle state control system irrespective of gas mass flow and gas temperature. The valve seat comprises a support structure distinct from the sealing edge and arranged to providing a supporting contact to the sealing, face to counteract deformations of the sealing face.

In use, an inlet pressure is exerted on the valve member via the valve seat orifice, the valve member being enclosed in the valve outlet so that an outlet pressure counteracts on the valve member; the valve member being subject to force generated by a pressure difference between inlet and outlet. An electric actuator is coupled to the valve member. A continuously variable force set point can be set that activates a valve integrated pressure servo mechanism (explained in further detail with the discussion of FIG. 2).

In this way, a smooth continuously variable operation is achieved without complexity since the pressure set parameters according to this arrangement can directly control the mechanical force dynamics required for driver's compartment movement irrespective of temperature and mass flow. It was found that a support structure may significantly enhance the reproducibility of a pressure to solenoid set current relationship, specifically during opening and closing of the valve, relevant for accurate adjustment of small pressure changes. As a result pressure control may be greatly simplified. Further areas of applicability of the present systems and methods will become apparent from the detailed description provided hereinafter. It should be understood that the detailed description and specific examples, while indicating exemplary embodiments of the displays and methods, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawing wherein:

DETAILED DESCRIPTION

The following description of certain exemplary embodiments is merely exemplary in nature and is in no way intended to limit the invention, its application, or uses. In the following detailed description of embodiments of the present systems, devices and methods, reference is made to the accompanying drawings which form a part hereof, and in which are shown by way of illustration specific embodiments in which the described devices and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Figure 1:
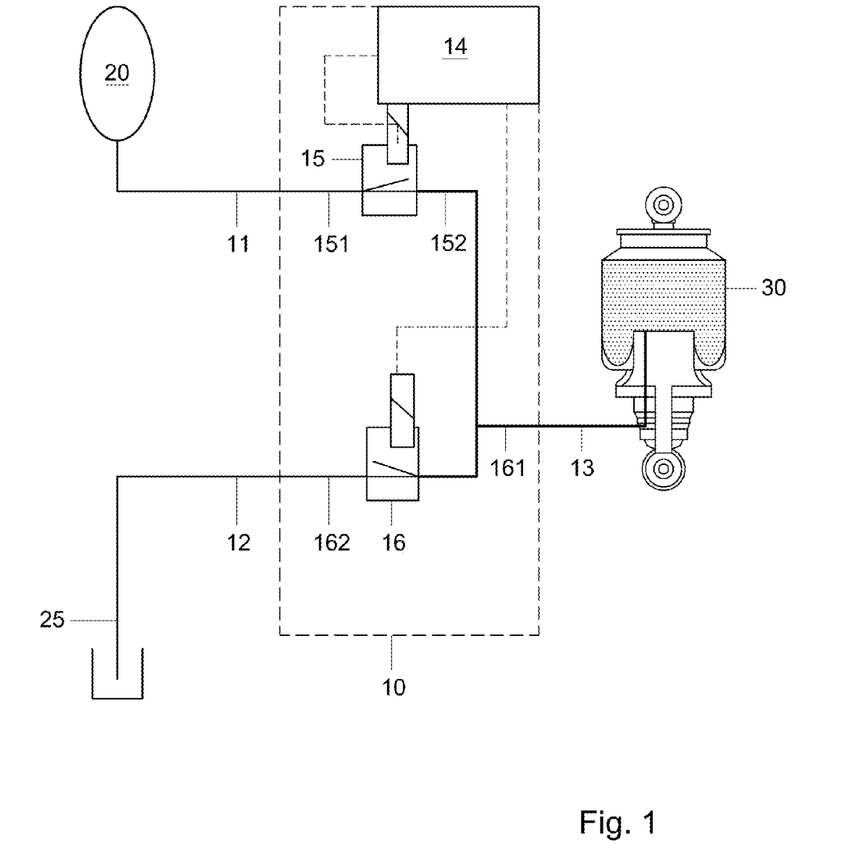
FIG. 1 shows one of the pneumatic springs with a valve system.

FIG. 1 shows a pneumatic spring 30 with a valve device 10 which selectively couples the spring 30 to either a pressure supply 20 or a pressure uptake, in the example an atmospheric vent 25. The pneumatic spring forms part of a mounting arrangement for mounting a driver's compartment on a vehicle chassis; typically of a large freight truck (not shown). The suspension is preferably arranged in a four point suspension but can also be formed in other configurations; for example, in combination with couplers coupling the cabin to the vehicle chassis such as (flexible) hinges; for example, with the pneumatic springs arranged along a lateral side of the driver's compartment, typically a front side of the vehicle. In this way, the spring 30 can be coupled between a driver's compartment and a vehicle chassis (not shown) and forms a pneumatic spring that can be communicatively coupled selectively to the pressure supply 20 or vent 25 to obtain gas mass flow to or from the spring 30. The valve device is communicatively coupled to the pressure supply via pressure terminal 11; to the vent via vent terminal 12 and to a respective pneumatic spring via spring terminal 13. The valve device comprises a first valve 15 selectively coupling the pneumatic spring 30 and the pressure supply 20 and a second valve 16 selectively coupling the pneumatic spring 30 and the vent 25 under control of a controller 14 arranged to switch first and second valves 15, 16 alternatively for pressurizing or depressurizing the pneumatic spring 30. Controller 14 is provided for setting the force set point of the valve by powering the actuator based on a reference set value and is communicatively coupled with a vehicle state control system (not shown). The vehicle state control system derives cabin motions from a number of dynamic input variables; such as: vehicle speed; vehicle acceleration; absolute roll; pitch and heave velocities (for skyhook control) of the truck cabin; cabin height and tilt; steering angle and lateral acceleration such as roll, pitch, and heave velocity. Based on a feed forward control strategy alone, a pneumatic pressure can be controlled in the pneumatic spring irrespective of mass flow and temperature. In addition, advantageously, a pressure sensor and height sensor in the pneumatic spring 30 may provide set values via a feedback control. Upstream valve 15 has a valve inlet 151 coupled to pressure supply 20 and a valve outlet 152 formed by the spring terminal 13. A second downstream valve 16 has an inlet 161 coupled to the spring terminal 13 and an outlet 162 coupled to the vent 25 via a vent terminal 12. Valves 15 and 16 are of a force settable type for defining a settable pressure difference between the inlet and outlet terminals of the valves respectively and are in more detail illustrated in FIG. 2.

Figure 2:
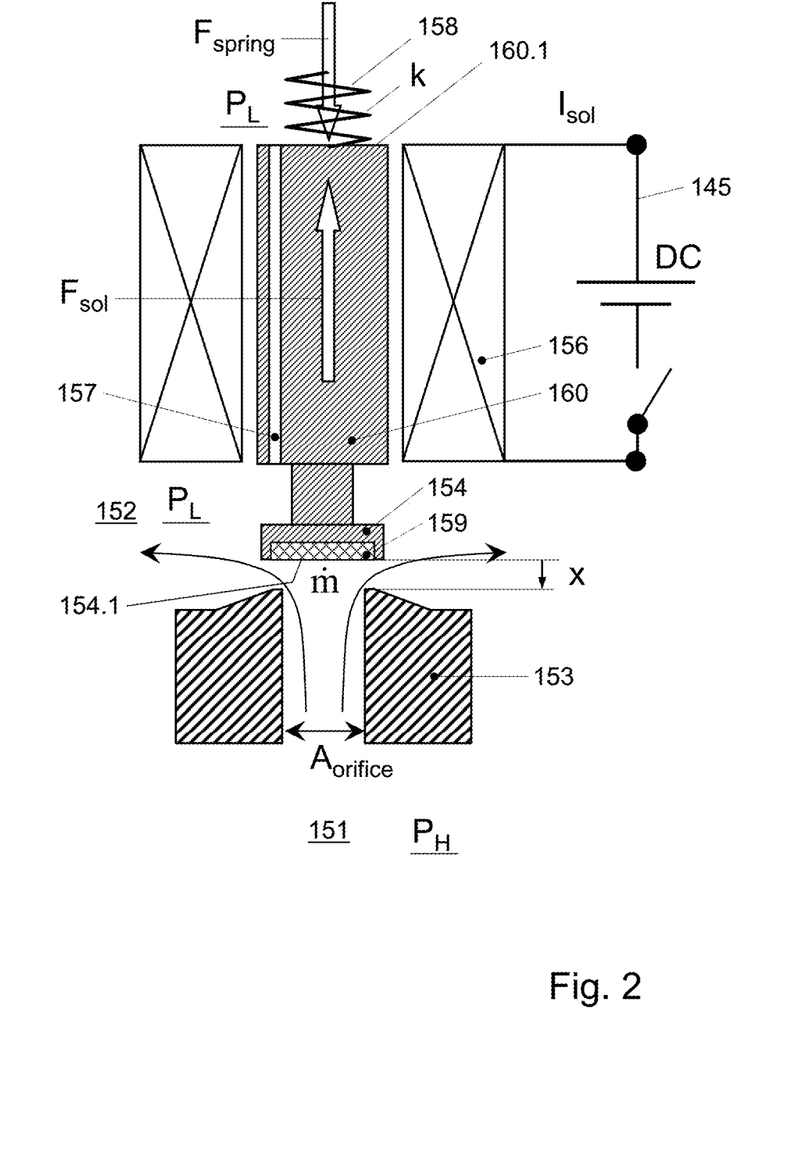
FIG. 2 shows the working principle of the valve of FIG. 1.

The valve of FIG. 2 comprises a valve seat 153 that defines a pilot pressure area substantially equal to the seat orifice $A_{orifice}$. It is noted that in an inverted geometry of the actuator, the valve member may be actuated via orifice A and may thereby have a reduced effective area on the valve member 154 subject to the pressure difference between in and outlet pressure. A typical orifice can be about 6 mm wide in diameter or larger to have sufficient fast gas flow with pressure values of 5-10 bar and switching times with typical time constants of 0.5-1.5 seconds to provide force variations of 3000-6000 N. The electromagnetic force provided for a set current $I_{sol}$ (current control 145) via a solenoid 156 which functions as a magnetic actuation device, with a force ranging in predetermined force range of approximately 10% (dependent on the design of the proportional valve and desired accuracy of proportional pneumatic pressure control) from an average set force irrespective of the valve member position.

High pressure $P_H$ from inlet 151 is balanced by low pressure $P_L$ from outlet 152 resulting in a net pressure of $P_H$ minus $P_L$ exerted on valve member via an effective valve member surface with area $A_{orifice}$. A force difference between a relatively weak spring (with sufficient pretension force) and a controlled counter force of the solenoid balances the pressure difference on this effective valve member surface area. Hereby an unidirectional flow throughput is established which is effective by a valve member gap distance x. Since the solenoid controls this counterforce to be constant, the throughput is made effective irrespective of gas flow and temperature, and the pressure in outlet 152 (coupled to pneumatic spring) is held constant relative to the inlet 151 (coupled to pressure supply). In this way an automatic pneumatic pressure control servo mechanism is established wherein the valve member is held floating due to the pressure difference and the controlled counterforce. When throughput fluctuations arise due to thermal effects or dynamic impact, the floating pressure member automatically adjusts under influence of the preset force thus establishing a pressure control servo mechanism. Controller 14 (see FIG. 1) can thus provide a force set point directly related to a pressure control in the pneumatic spring irrespective of temperature and gas flow.

The valve member 154 is pressed in normally closed condition against the valve seat 153 by a spring 158 via piston anchor 160 for example, a coil spring (further explained with reference to the figures herein below). The valve member 154 is coupled to a piston anchor 160 that may be provided with a bore 157 for tuning piston motion damping and allowing the outlet pressure to enclose the valve member so that an outlet pressure $P_L$ counteracts on the valve member 154. Electric actuator 156 is mechanically coupled to the valve member 154 via piston anchor 160, the actuator 156 having a continuously variable force set point by current control 145.

The equations of valve member motion are substantially as follows:

$$F_{spring} - F_{sol}(I, x) = m_{sol}\ddot{x} + c\dot{x} + kx + (p_H - p_L) \cdot A_{orifice}$$

$$p_H - p_L = f(\dot{m}, x)$$

$$\Downarrow \text{steady state}$$

$$(p_H - p_L)_{ss} = \frac{F_{spring} - F_{sol}(I, x)}{A_{orifice}}$$

Here, $F_{spring}$ is a pretension force, strong enough to close the valve (leakage free) irrespective of the actuator pressure, exerted by spring 158 and $F_{sol}$ is the counter force provided by solenoid system 156; k is a spring constant of spring 158 and c is a damping factor substantially caused by the friction of motion in the solenoid, spring friction and energy dissipation generated by a specifically dimensioned damping bore 157 that chokes the air flow that is forced through the bore. A typical pretension force may be about 40-100 N, typically 60 N Valve member 154 and/or valve seat 153 preferably comprises an elastomeric sealant 159 to completely seal the orifice in normally closed condition, contrary to sliding valve types as for instance disclosed in DE10200901.2581. By the sealant 159, in normally closed condition, the valve will completely seal the gas in the pneumatic spring, which will reduce power use. The seal is sufficiently rigid to prevent ridging, and substantially maintain its geometry in use.

High inlet pressure $P_H$ is communicated on the valve member surface 154.1 via effective valve orifice $A_{orifice}$ in opening direction. Low outlet pressure $p_L$ is counteracting the valve member in closing direction on effective surface 160.1 axially opposite first valve member surface 154.1. In use, an inlet pressure is exerted on an effective area or pilot pressure area of the valve member 154 via the valve seat 153 orifice, the valve member 154 being enclosed in the valve outlet by casing (not shown) so that an outlet pressure $P_L$ counteracts on the valve member 154; the valve member 154 being subject to force generated by a pressure difference between inlet 151 and outlet 152. The pressure servo mechanism gives rise to the fact that the pressure difference between inlet and out outlet is automatically adjusted in relation (or proportion) to the spring closing force $F_{spring}$ minus the actuated solenoid force $F_{sol}$ (see steady state equation). The larger the orifice area $A_{orifice}$, the more sensitive the control of pressure servo mechanism will react to changes in actuation force $F_{sol}$ and disturbances in mass flow and temperature.

Figure 3:
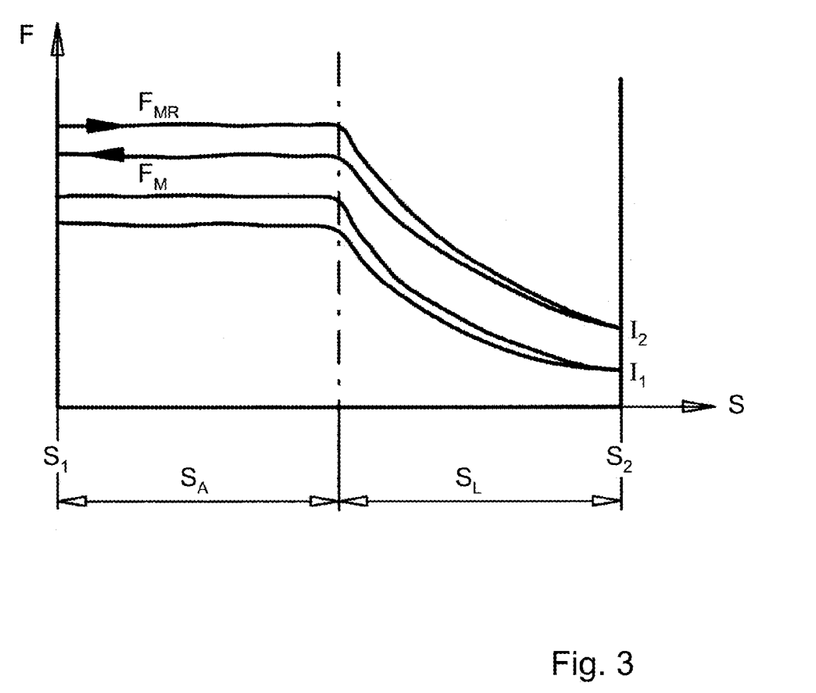
FIG. 3 shows an exemplary force diagram of the settable force valve.

A typical force diagram of solenoid system 156 is shown in FIG. 3. The pressure is thereby controlled electrically, wherein the solenoid electric control signal is supplied by appropriate control electronics operating the solenoid 156 (control currents $I_1$, $I_2$). FIG. 3 shows good constant force behaviour of the solenoid irrespective of the valve member position (S). The solenoid force is characterized by a constant force behaviour of the solenoid irrespective of the valve member position. While practical values may vary, preferably, the electric actuation is provided by a solenoid with a net force ranging in predetermined force range of approximately 10% from an average set force irrespective of the valve member position defined by system properties specifically, having a spring constant that is in combination with the spring stiffness characteristic of the spring 158 (see FIG. 2) preferably very low. A typical value may be less than about 3 N/mm and values 10 N/mm. Remarkably, with practical pressures of 5-15 bar, while the spring pretension force (depending of the orifice area $A_{orifice}$ may be typically quite strong (typically 50-100 N)), the spring constant is preferably very low for efficient control dynamics. In addition, or alternatively, control circuitry may be arranged to vary the control power dependent on the valve position; to supply a substantially constant force irrespective of the opening distance by an electric actuator with a settable electromagnetic force for each valve member position.

Figure 4:
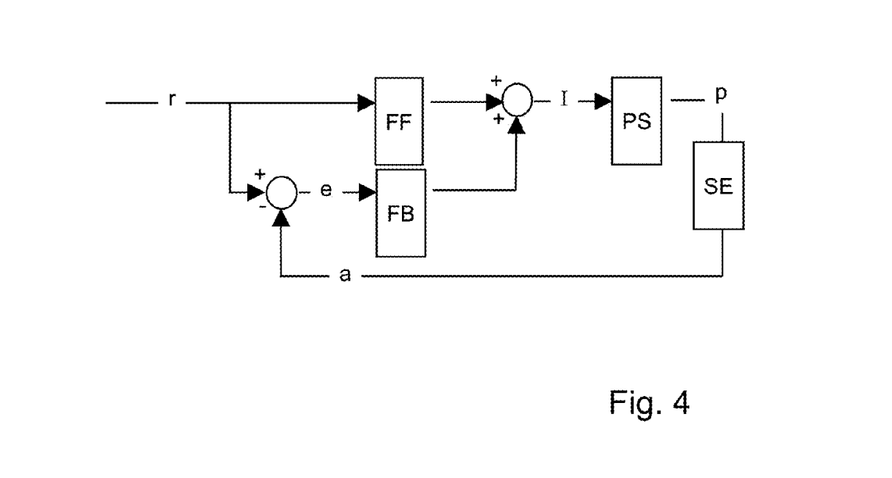
FIG. 4 show a pressure control loop illustrating no temperature and volume dependencies.
Figure 5:
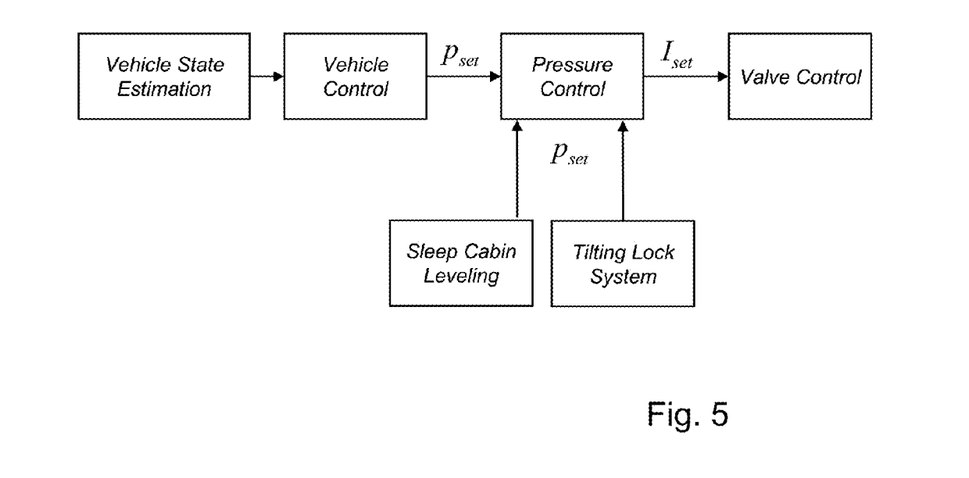
FIG. 5 shows an exemplary vehicle state estimation diagram

FIG. 4 and FIG. 5 illustrate an error control loop that combines pressure feedback and feed forward control. The following variables are used:
r; reference pressure signal
e; error signal
I; current signal
p; pressure in pneumatic system
a; measured pressure in system
FB; Weak feedback controller
FF; Feedforward based on PI-characteristic
PS; Pneumatic system (valve and air-spring & other hardware
SE; Pressure sensor The better the accuracy of the valve integrated pressure servo mechanism the more on feed forward according to measured pressure-current (P-I) characteristics can be relied by designing the required computer control system. Additional feedback from the spring pressure sensor may be provided for setting the pressure which optimizes the dynamic behaviour of the spring 30. Feedback from the spring deflection may be provided to further optimize the behaviour of the pneumatic spring, typically, to provide passive spring behaviour with a fixed constant gas amount minimizing the power use of the spring system.

FIG. 5 shows a relation between a vehicle state estimation and the valve control; via a vehicle state control system that may provide a feed forward characteristic with a force set value to pressure controller. The vehicle state estimator is formed from a number of dynamic input variables; such as: vehicle speed; vehicle acceleration; absolute roll; pitch and heave velocities (for skyhook control) of the truck cabin; cabin height and tilt; steering angle and lateral acceleration.

In an embodiment; the pressure controller selectively powers the actuator dependent on a measured height different from a set height for passive pneumatic spring action; wherein the selective powering is dependent on a predetermined set height larger than 5% of the measured height to reduce energy consumption (during highway operation for instance). Alternatively or additionally, the pressure controller selectively powers the actuator so as to have a set height that levels the driver's compartment for example, during parking. A level cabin provides more comfort, specifically for sleeping to the driver when parked on uneven surface. The vehicle state estimator may provide selectively powering of the actuator dependent on a vehicle state safety condition.

Figure 6A:
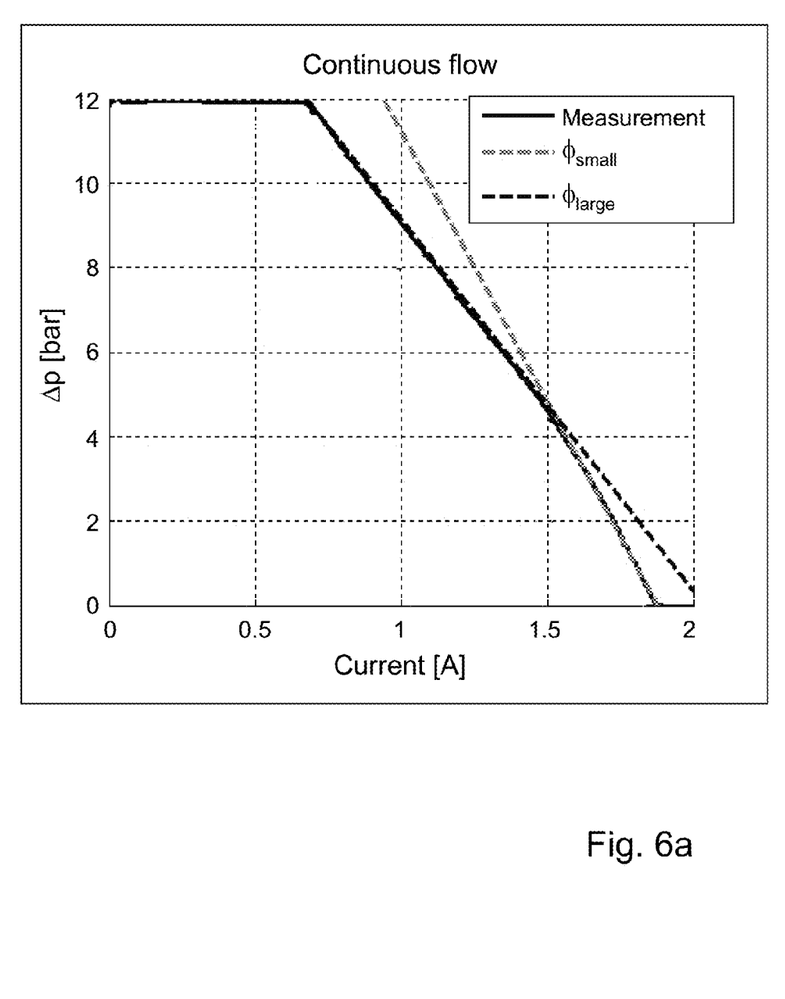
FIG. 6 illustrates an example of a measured pressure-current (P-I) characteristic.

FIG. 6A illustrates an example of a measured pressure-current (P-I) characteristic illustrating a linearity problem which is typically caused by an unstable effective orifice or more precisely, a varying (not well defined) pilot pressure area which will be explained in more depth with the discussion of FIG. 6B. Since the pressure control is preferably arranged by a feed-forward constant force actuator, it is important that the pilot pressure area or effective orifice is substantially exact and not suffering from disturbance related to different operating conditions. It is found that the two slopes in the diagram correspond with a varying effective pilot pressure area that is bounded by two extreme values; one of them φ-large appears about 10% larger than the measured inner dimension of the orifice. In particular, an effective orifice (φ-large seems to be present in the high pressure range (where the valve is nearly closed, and the pressure difference is maximal), whereas an effective orifice (φ-small appears to dominate the valve behavior the low pressure range (where the valve is also just opened, at a zero pressure difference). This dualistic behavior of the pressure to current relationship of the control valve may be quite cumbersome to base an accurate computer pressure control system on, especially considering the fact that the in FIG. 6 displayed non-linearity is strongly influenced by varying operating conditions of the valve (pressure dynamics, temperature, load memory effects, etc. . . . ) In an aspect of the invention a valve design, as herein below clarified is provided, to overcome the problem of an unstable effective orifice, and aims at providing a non-disturbed, well defined pilot pressure area ensuring a stable and reproducible pressure to current characteristic that can be used as a reliable feed forward structure in the pressure control algorithm which provides for a preset pressure in the range, in the case of the example between 0 and 12 bar.

Figure 6B:
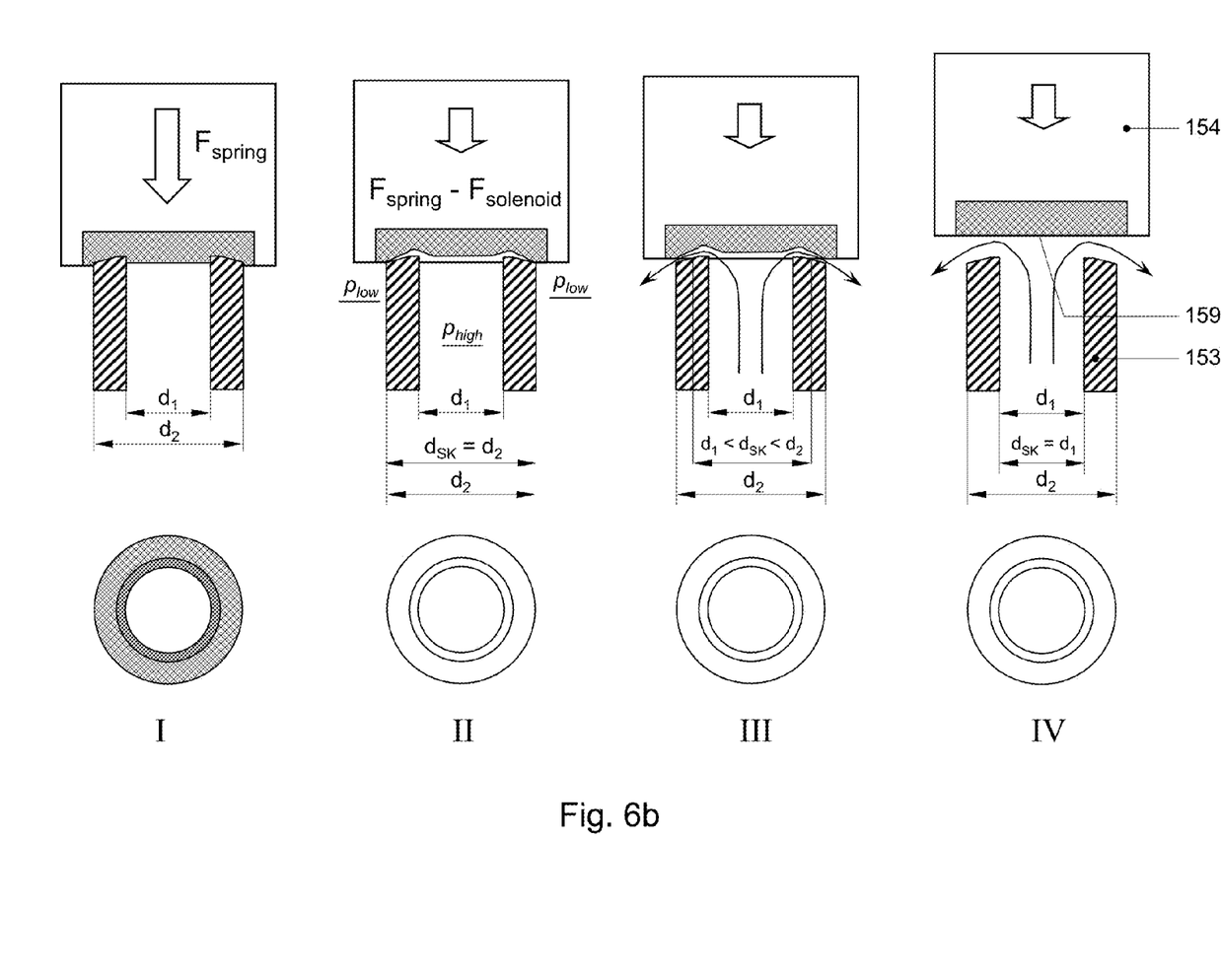

Without being bound to theory, to further explain aspects of the present invention, FIG. 6B schematically shows four operating conditions (i-iv) of a valve member 154 closing a valve seat 153, ranging from fully closed (i) to widely opened (iv). Depending on the actual pressure difference acting on the elastomeric sealing face 159 and the forces of the coil spring and solenoid acting on the valve member 154 and the actual distance of the sealing face 159 to the valve seat, the elastomeric sealing face 159 may slightly deform in different manners. Consequently the effective pilot pressure can be disturbed due to the changes in orifice geometry. When the valve is fully closed with sufficient closing load, being the sum of spring and solenoid force acting against a low pressure drop, the pilot pressure area on the sealing face 159 will be sharply defined by the inner diameter $d_1$ of the (conical) valve seat 153. This is typically the case in the high current range of the pressure to current characteristic of FIG. 6. However when the valve starts to lift (condition iii and iv) pressurized gas molecules start entering the (deformed) elastomeric seat zone that normally is fully contacting the valve seat surface. Depending on valve position and actual pressure drop, the pilot pressure area may range between diameter $d_1$, being the inner diameter and diameter $d_2$, being the outer diameter of the valve seat. In an extreme case the effective pilot pressure may be dictated by the outer valve seat diameter $d_2$, which typically is the case at high pressure difference (large deformation of the elastomeric sealing face) and nearly closed position (when only little air flow needs to be choked by the valve; low pressure dynamics), illustrated by the condition illustrated in FIG. 6b (ii). The larger the difference between inner diameter $d_1$ and outer diameter $d_2$, the more the pressure to current characteristic of the valve may be disturbed.

Figure 7:
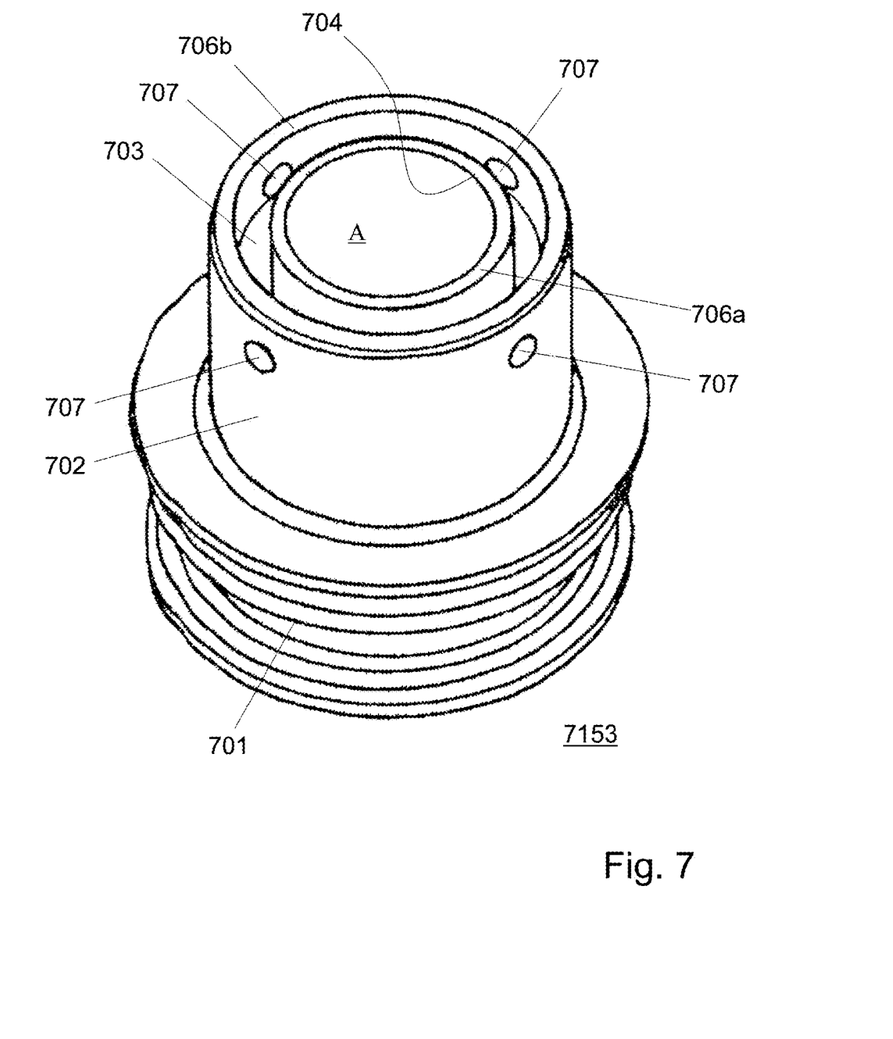
FIG. 7 illustrates a valve seat according to a first embodiment.

FIG. 7 illustrates a detail view of a valve seat 7153 of a type as schematically disclosed in FIG. 2 that is designed to circumvent the here above illustrated deformations. The valve seat 7153 is provided in circular symmetric form, of a non-corrosive metallic material. The valve seat can have a screw threaded 701 base for fixing it to a valve housing typically against an O-ring provided as sealant (not shown). Alternatively the base is press fitted in the valve block housing. Freestanding cylinder form 702 defines an outer contour of the valve seat 7153, concentric to and providing an annular space 703 between an inner cylinder which forms the sealing edge 704. The freestanding cylinder form 702 forms a support structure distinct from the sealing edge 704 and is arranged to providing supporting contact 706b to the sealing face of a planar valve member (see herein below) to counteract substantial deformations of the sealing face thereby reducing material stress of the elastomeric seal, specifically in the region of the thin-walled sealing edge 704 which defines an effective pilot pressure surface on a sealing face of a valve member. The end surfaces 706a and 706b of the sealing edge and support structures 702, in closed position, both exert contact pressure to the sealing face of a valve member but the effective orifice is substantially defined by the thin-walled contour of the sealing edge 704. Sealing edge 704 may have a substantially planar contact surface 706a that may be smaller than about 35% of the inner area A. The support structure is dimensioned such that the mechanical stress in the elastomeric sealing face is sufficiently low to avoid durability problems, but high enough to produce sufficient contact pressure in the actual sealing edge 704 to ensure leakage free operation at maximum pressure drop condition. Typical measures to tune such a design are: size of contact surface 706b, height difference between sealing edge and supporting edge, stiffness variations in in the sealing face, application of metallic inserts in the elastomer, application of dedicated hard contact stoppers and/or contact surfaces having edges that are slightly rounded or tapered, i.e. having rims without acute angles. In the example of FIG. 7, the sealing edge 704 protrudes about 50 micron or more, for example about 100 micron, from a plane of contact formed by distal support surface 706b of the support structure, which enhances sealing contact of the sealing edge 704. Alternatively the sealing edge 704 and supporting structure form a substantially flush planar contact surface.

In the shown embodiment the support structure is formed having a continuous support face 706*b* around the sealing edge 704 is provided around the sealing edge 704 and arranges that yet a suitable support can be provided to receive the closing force of the spring necessary for suitable closure of the valve. The support 702 further comprises passages 707; preferably arranged below the continuous support face 706*b* in a side wall thereof for allowing passage of the outlet pressure to the sealing edge. In use, therefore, the sealing edge forms a division between the inlet pressure and the outlet pressure; and since the sealing edge 704, relative to the orifice diameter nay be very thin-walled, there may be only an insignificant variation of the pilot pressure area defined by the orifice thus enhancing the stability of the valve pressure control servo mechanism (as explained in the discussion of FIG. 2), specifically in the (near) closing position of the valve member.

Figure 8:
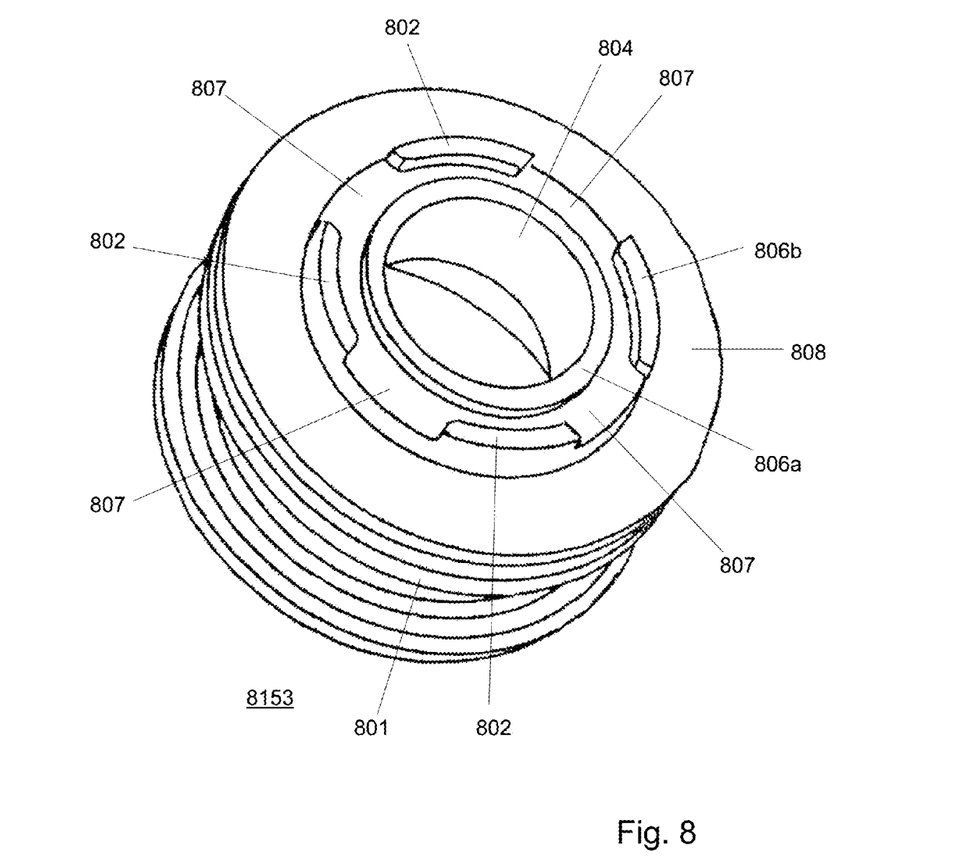
FIG. 8 illustrates a valve seat according to a second embodiment.

FIG. 8 provides an alternative form for a valve seat 8153 that arranges for a stable pilot pressure area. In this embodiment, a support structure is formed by a plurality of struts 802 circumferentially arranged around the sealing edge 804. The sealing edge 804 is formed in a continuous circumferential manner, formed as an axially distal part of the e.g. screw threaded or press fitted base 801. Radially distanced of the circular sealing edge 804, concentric thereto are struts 802 that are also protruding from a flange part 808 of the base and formed around the sealing edge 804. The struts 802 may have various forms and contact surfaces, as long as they are effectively supporting the valve member, and allowing passages 807 of the outlet pressure to the sealing edge 804.

In addition or alternatively, the struts may correspond to inserts (not shown) in the elastomeric face of the valve member, with the objective to locally stiffen the elastomeric structure where the supporting struts hit the sealing face. In this manner extreme deformations of the elastomer can be accurately bounded to an exact limit avoiding damage of the elastomer in the sealing edge region, for example, in a case when unusual difference pressures are exerted in closing direction, e.g. in pressurizing or depressurizing conditions, when the supply pressure drops to zero, while the pressure user terminal is still pressurized. While the embodiment shows that the supporting faces 806*b* of the struts 802 and the sealing edge 806 a are flush, the struts may be slightly less protruding, so that first contact may be formed by the sealing edge 804, and the support member 802 may partly function as a stopper.

Figure 9:
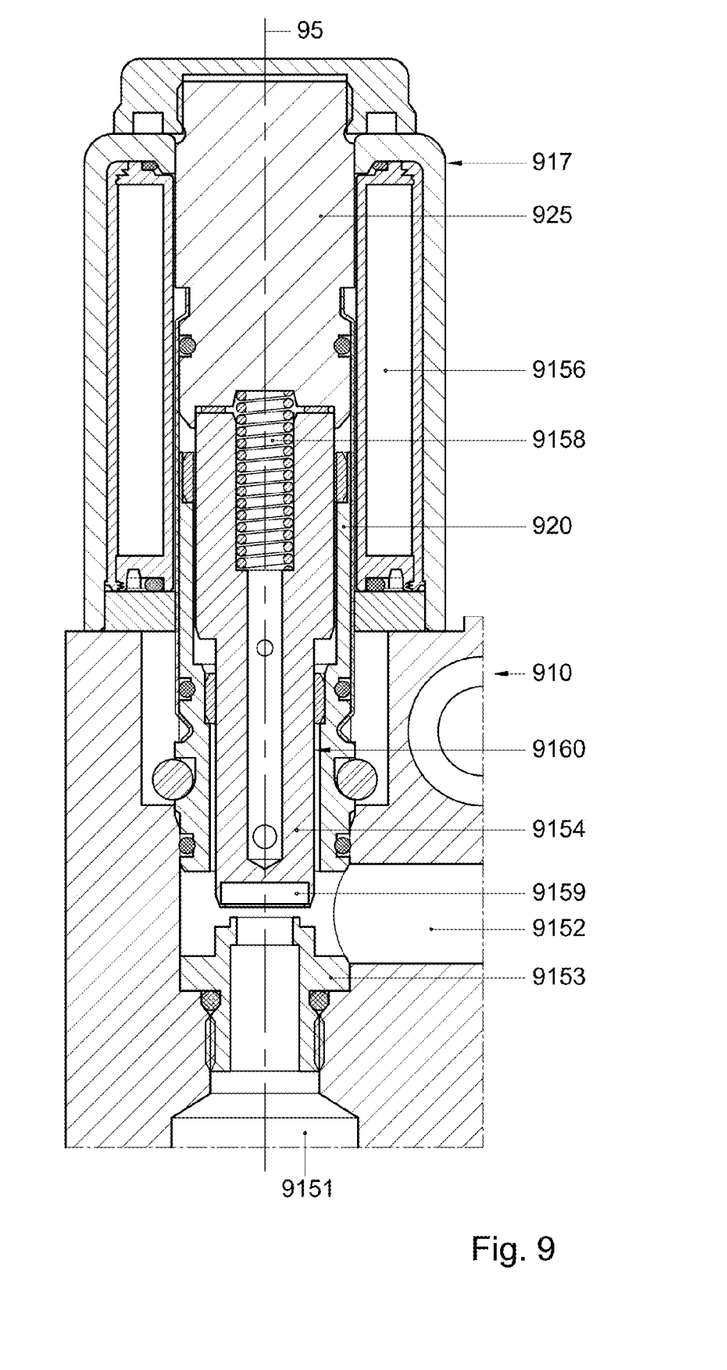
FIG. 9 illustrates a valve device according to a first embodiment.

FIG. 9 shows an exemplary valve embodiment e.g. incorporating a valve seat 9153 as previously disclosed. The valve has housing 910 with a valve bore oriented along an axis 95 that forms a working axis for movable valve member 9154 which is integrated to anchor part 9160. The valve has a pressure inlet terminal 9151 and a pressure outlet terminal 9152 so that in use, an inlet pressure is exerted on elastomeric sealing face 9159 of the valve member 9154 via the valve seat orifice. The sealing face 9159 is depicted as an elastomeric insert that is embedded or fixed to a metal end face of the anchor part 9160. In an alternative embodiment, valve member 9154 may be formed with a metal-vulcanized elastomeric coating that functions as a sealing face 9159. In another alternative embodiment, a poly-urethane coating may be used. This may accommodate further tuning of the thickness and geometry of the sealing face 9159. To aid further smooth releasing of the elastomeric sealing face 9159 from the valve seat 9153, the valve seat may comprise an anti-stick coating e.g. of teflon. The valve member 9154 is arranged in the valve outlet enclosed in the housing 910 so that an outlet pressure counteracts on the valve member 9154. Anchor 9160 is actuated by a feeding current in a magnet coil 9156. The anchor 9160 is axially movable in a pole tube 920 relative to a pole core 925 of the solenoid in a known fashion and thereby forming a magnetic actuation device 917. The valve member 9154 is depicted in opened position. In the rest position, without a feeding current, the magnet looses its pulling force, and the valve is closed by the spring 9158 pressing the sealing face of the valve member 9154 in sealing contact to the sealing edge of the valve seat 9153. Spring 9158 is arranged in the inside of a solenoid, more precisely, in a bore of the plunger 9160 separating the anchor 9160 and the pole core 925. This arrangement may provide for tuning a bias force of the spring 9158 by means of an adjustment screw (not disclosed).

Figure 10:
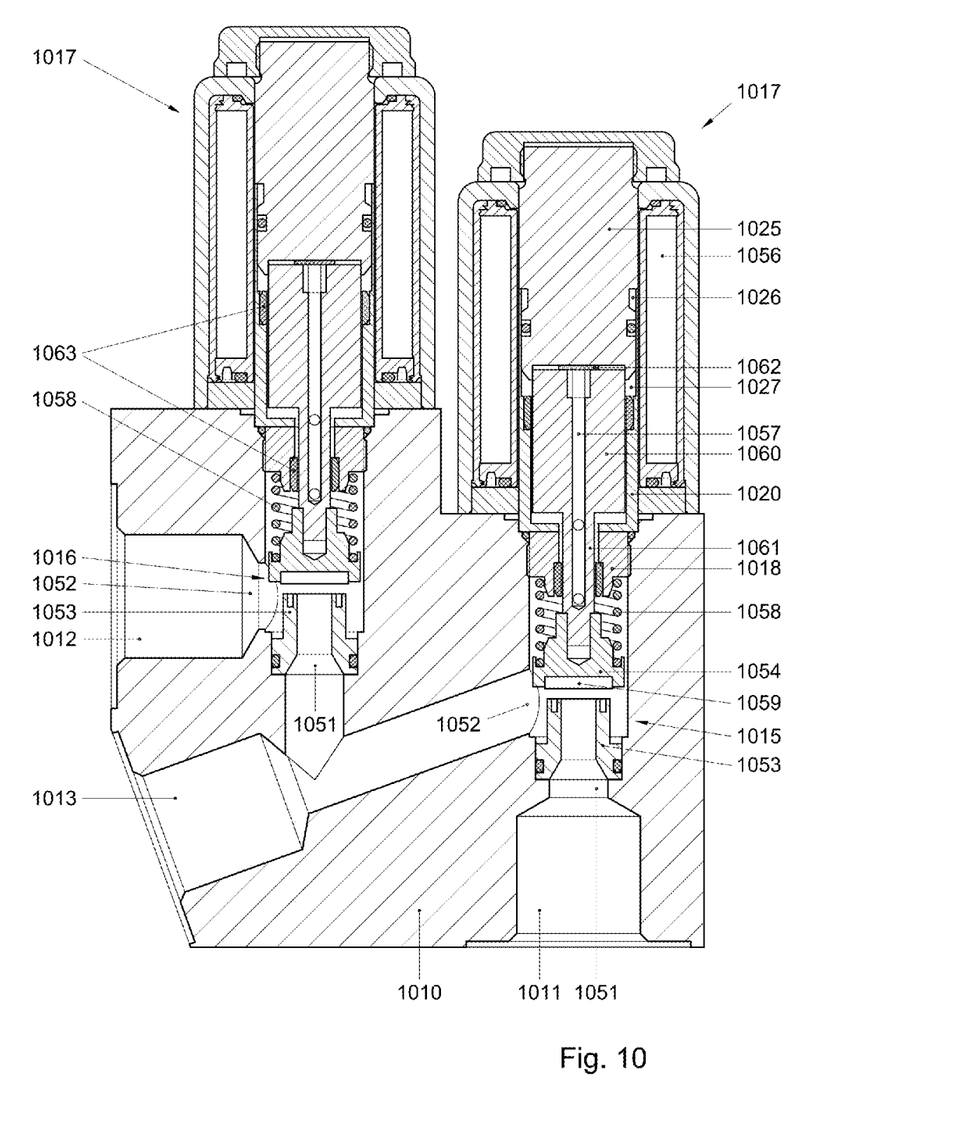
FIG. 10 illustrates a valve device according to a second embodiment.
Figure 11:
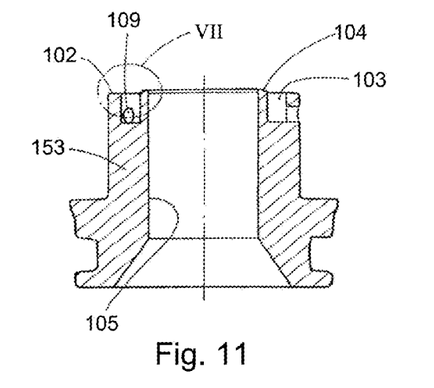
FIG. 11 a sectional view of a valve seat according to another embodiment.

FIG. 10 shows a further exemplary assembled valve device having a modified geometry for the closing spring 1058. In the assembled device, for each respective pneumatic spring, a housing 1010 is provided with a respective pressure terminal 1011; pressure uptake terminal 1012 and spring terminal 1013. The valve device comprises two valves 1015, 1016, consisting of a seal to seat configuration e.g. according to setup as discussed in FIG. 7 or FIG. 8. The valves 1015, 1016 are serially connected. Upstream valve 1015 has a valve inlet 1051 coupled to a pressure supply (not shown) and a valve outlet 1052 formed by the spring terminal 1013. Downstream valve 1016 has an inlet 1051 coupled to the spring terminal 1013 and an outlet 1052 coupled to an pressure uptake (vent) via a pressure uptake terminal 1012. The seats 1053 each provide for a coaxial flow channel with an orifice that, in use, forms a division between the inlet pressure and the outlet pressure of the valve. Embodiments of the seats 1053 arranged to providing supporting contact to the sealing face 1059 of the valve member 1054 have been disclosed in the previous figures and form an effective orifice on sealing face 1059. In FIG. 10, both valves are depicted in open position.

Bringing in mind the equation of motion of valve member 1054 as here above clarified, by placing the spring 1058 outside the coil 1056 the spring 1058 may have, due to its wide diameter, a lowered spring constant. This is important for achieving high controller dynamics and improving the accuracy of the pressure servo mechanism. The spring 1058 has reduced friction and buckling problems, and thereby enhances ideal spring behaviour. The spring 1058 is to this end provided around a protruding part 1061 of the anchor 1060 on a rest 1018 outside the pole tube magnet coil 1056. The spring 1058 is tensioned between the valve member 1054 and the rest 1018 of housing 1010 outside the pole tube. Further, the anchor 1060 has a bore 1057 to tune damping and allowing the outlet pressure to enclose the valve member 154 so that an outlet pressure PL counteracts on the valve member 154. Further, by way of example a low friction bearing 1063, e.g. by a teflon liner provides guiding of the anchor 1060. Interestingly a feed forward design of pressure control as disclosed herein lacks a need for precise tuning of the spring bias since this can be arranged by identifying a zero-crossing in the pressure-current characteristic by the pressure control software, reducing assembly costs due to the fact that adjustment screw for setting the exact pretension of the spring can be omitted. A magnet stopper part, or more specifically anti-adhesion disc 1062 is arranged between the anchor 1060 and the pole core 1025 to prevent adhesion of the anchor 1060 against the pole core 1025. The thickness of the anti-adhesion disc 1062 may limit the movement of the anchor in the flat zone of the solenoid force position characteristic as shown in FIG. 3. Moreover, due to the absence of disturbing geometry of spring parts etc. inside the magnet coil, tuning characteristics of the magnetic actuation device 1017 can be significantly enhanced. The reason is that due to this valve design with a wide diameter spring that is located outside the pole core and anchor region, more iron can be enveloped inside the available solenoid dimensions, specifically in the pole core and anchor. As a result a higher peak solenoid force within the same volume and at same electric current can be achieved resulting in a more compact valve design with optimal system dynamics. The magnet stopper part 1062, for example, in combination with tuning spaces 1026, 1027 determine the geometry of the cone in the anchor to core transition section, thereby effectively influencing the direction of concentrated magnetic field lines in the pole chore 1025. In this way an effective spring constant characteristic may be provided that is negative and smaller than the elastic means 1058 to provide a current force characteristic of the magnet actuator 1017 that is substantially constant irrespective of the valve member position.

Figure 12:
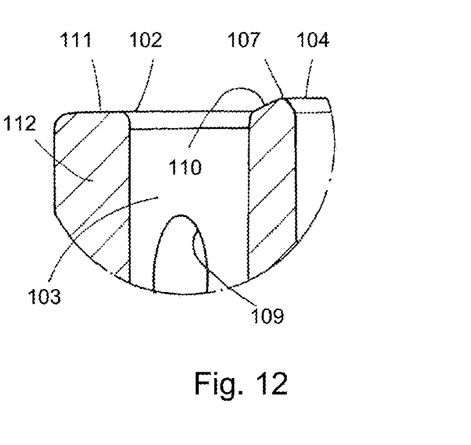
FIGS. 12 and 13: enlarged views of different embodiments of part VII of FIG. 11.
Figure 13:
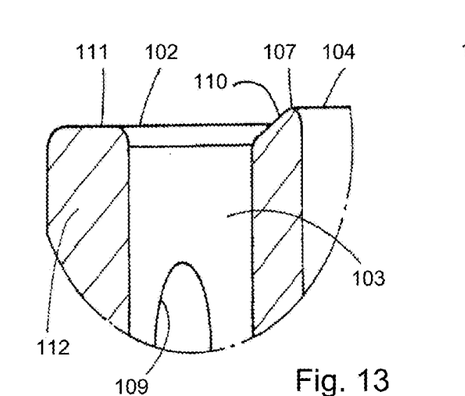
Figure 14:
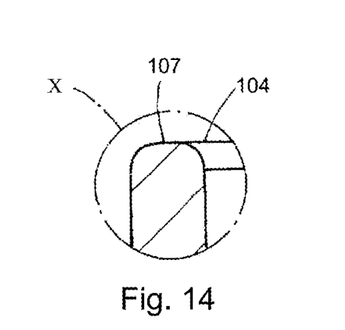
FIG. 14 a sectional view of a valve seat according to yet another embodiment.
Figure 15:
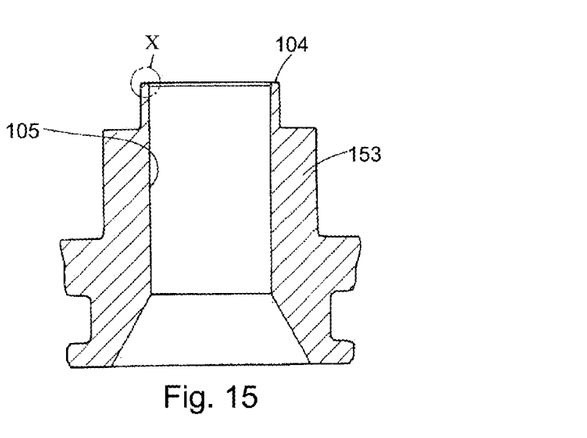
FIG. 15 enlarged view of a part X of FIG. 14.

FIGS. 11-15 show further embodiments of the valve seat 153 for the suspension system as previously disclosed. In the embodiments illustrated in FIGS. 11-13 the valve seat 153 has a sealing edge 104 that surround the pressure inlet orifice 105, and the supporting faces 102. The supporting faces surround as annular members 112 an annular space 103, wherein bores 109 are provided allowing passage of the outlet pressure to the sealing edge 104. In the figures, it can be seen that, in contrast to the embodiment of FIG. 7, the sealing edge 104 and supporting faces 102 are formed in parallel planes that are slightly offset relative to each other, so that the plane of the supporting faces 102 has a larger distance to the valve member of the valve, as shown in FIGS. 12 and 13. Furthermore, the rim of the sealing edge 104 is formed with rounded contour, so that between the side faces a contact zone 107 for contacting the sealing face, where the embodiment of FIG. 13 shows a tapered face with larger inclination 110 than the opposing inner contact zone 107. The supporting faces 102 are formed with rounded edges and planar contact sides 111.

Of course, this description is deemed to disclose any one of the above embodiments or processes in combination with one or with one or more other embodiments or processes to provide even further improvements in finding and matching users with particular personalities, and providing relevant recommendations. Where the solenoid systems disclosed are of a pulling system that pull the valve member via a piston from the valve seat against spring force; similar configurations are feasible wherein a valve is pushed against the valve seat; or wherein the piston is actuated extending through the valve seat, resulting in a net set force counteracting the pressure difference on the valve member thus establishing a gas flow through a variable gap between the valve member and the valve seat.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. Pneumatic suspension system for a vehicle, comprising:

a mounting arrangement for mounting a portion of the vehicle on a chassis; the mounting arrangement including at least one pneumatic spring to be arranged and coupled between the portion of the vehicle and the vehicle chassis;

a pressure supply and a pressure uptake;

a valve device communicatively coupled to a respective one of said at least one pneumatic spring via a respective spring terminal, the valve device further communicatively coupled to the pressure supply via a pressure terminal and to the pressure uptake via a pressure uptake terminal;

a vehicle state control system that provides a pressure set value in the pneumatic spring;

a pressure controller arranged to the valve device alternatively for pressurizing or depressurizing the respective one of said at least one pneumatic spring;

wherein the valve device comprises at least a first valve having a valve outlet coupled to the spring terminal and a valve inlet communicatively coupled to the pressure terminal, and further comprising a valve seat comprising an orifice with a sealing edge and valve member comprising a sealing face; the sealing face being pressed in normally closed condition against the sealing edge by an elastic element; so that in use, an inlet pressure is exerted on the valve member via the orifice, so that an outlet pressure counteracts on the valve member; the valve member being subject to force generated by a pressure difference between inlet and outlet on an effective area of the sealing face defined by the sealing edge; and an electric actuator mechanically coupled to the valve member having a continuously variable force set point so as to define, by the pressure controller, a set force counteracting the elastic element, to generate, by control of the force set point; a set pressure difference between the inlet and outlet derived from the vehicle state control system irrespective of gas mass flow and gas temperature;

the valve seat further comprising a support structure distinct from the sealing edge and arranged to providing supporting contact to the sealing face to counteract deformations of the sealing face.

2. Suspension system according to claim 1, wherein the support structure is arranged to allowing passage of the outlet pressure to the sealing edge; the sealing edge thereby, in use, forming a division between the inlet pressure and the outlet pressure.

3. Suspension system according to claim 1, wherein the support structure is formed having a continuous support face around the sealing edge and further comprising passages in a side wall adjacent the support face for allowing passage of the outlet pressure to the sealing edge.

4. Suspension system according to claim 1, wherein the support structure is formed by a plurality of struts circumferentially arranged around the sealing edge.

5. Suspension system according to claim 1, wherein the support structure forms an annular space and is formed concentric to the sealing edge.

6. Suspension system according to claim 1, wherein the sealing edge has a planar contact surface that is smaller than 35% of the effective orifice.

7. Suspension system according to claim 1, wherein the valve member comprises a stopper part arranged in the sealing face to abut the support structure, the stopper part of a different hardness than the sealing face.

8. Suspension system according to claim 7, wherein the stopper part is provided as an insert in the sealing face.

9. Suspension system according to claim 7, wherein (i) the valve member comprises a metal-vulcanized elastomeric coating, or (ii) the sealing edge comprises contact surfaces having edges that are slightly rounded or tapered, or both (i) and (ii).

10. Suspension system according to claim 1, further comprising a second valve having an inlet coupled to the spring terminal and an outlet coupled to the pressure uptake.

11. Suspension system according to claim 1, wherein the electric actuation is provided by a magnetic actuation device with an effective spring constant characteristic that in combination with spring stiffness characteristics of the elastic element results in a total effective set force provided by the sum of magnetic actuation and spring force ranging in a predetermined force range of 10% from an average set force irrespective of the valve member position.

12. Suspension system according to claim 11, wherein the magnetic actuation device is provided with an electromagnetic coil part; and an anchor axially movable relative to coil part; wherein a rest is provided outside the coil part for resting the elastic element that is formed by a wide diameter spring tensioned between the anchor and the rest.

13. Suspension system according to claim 12, wherein the electromagnetic coil part is further provided with a pole core; and wherein a magnet stopper part is arranged between the anchor and the pole chore.

14. Suspension system according to claim 1, wherein the controller selectively powers the actuator dependent on a measured height different from a set height for passive pneumatic spring action; wherein the selective powering is dependent on a predetermined set height larger than 5% of the measured height.

15. Suspension system according to claim 1, wherein the controller selectively powers the actuator so as to have a set height that levels a driver's compartment.

* * * * *